US012693813B2

(12) United States Patent
Misawa

(10) Patent No.: US 12,693,813 B2
(45) Date of Patent: Jul. 28, 2026

(54) INFORMATION PROCESSING APPARATUS, NON-TRANSITORY COMPUTER READABLE MEDIUM, AND INFORMATION PROCESSING METHOD

(71) Applicant: FUJIFILM BUSINESS INNOVATION CORP., Tokyo (JP)

(72) Inventor: Satoshi Misawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/181,934

(22) Filed: Mar. 10, 2023

(65) Prior Publication Data

US 2024/0103775 A1 Mar. 28, 2024

(30) Foreign Application Priority Data

Sep. 26, 2022 (JP) ................................. 2022-152301

(51) Int. Cl.
*G06F 3/12* (2006.01)
(52) U.S. Cl.
CPC .......... *G06F 3/1205* (2013.01); *G06F 3/1247* (2013.01)
(58) Field of Classification Search
CPC ............................. G06F 3/1205; G06F 3/1247
See application file for complete search history.

(56) References Cited

U.S. PATENT DOCUMENTS 8,456,690 B2 * 6/2013 Morales ................. H04N 1/387
358/448
2005/0231733 A1 * 10/2005 Pfaff ................. G01B 11/2441
257/E21.53

2008/0252898 A1 * 10/2008 Pfaff ................. G01B 11/2441
257/E21.53
2012/0127473 A1 * 5/2012 Pfaff ................. G01N 21/9505
356/457
2014/0267440 A1 * 9/2014 Tsukuda ................. G09G 5/393
345/619
2016/0195479 A1 * 7/2016 Pfaff ................. G01N 21/9505
356/458

(Continued)

FOREIGN PATENT DOCUMENTS

JP H11-328415 A 11/1999
JP 2020-006603 A 1/2020

*Primary Examiner* — Kevin Ky
(74) *Attorney, Agent, or Firm* — Oliff PLC

(57) ABSTRACT

An information processing apparatus includes a processor configured to: obtain region information of a print-page-inspection specified region for which whether inspection of a print result of a print page is necessary is specified, the region information being information in which a relative position from the reference position of the print page is indicated by coordinate values; generate coordinates-conversion information from imposition information indicating an imposition position at which the print page is to be imposed on a physical output sheet, the coordinates-conversion information being used in imposition of the print page at the imposition position on the output sheet; perform coordinates conversion on the region information according to the coordinates-conversion information, in imposition of the print page on the output sheet; and set the print-page-inspection specified region on the output sheet in accordance with coordinate values obtained after the coordinates conversion.

11 Claims, 6 Drawing Sheets

(56) References Cited

U.S. PATENT DOCUMENTS

| | | | | |
|---|---|---|---|---|
| 2016/0307076 A1* | 10/2016 | Muthupandi | ...... | G06K 15/1868 |
| 2020/0019353 A1 | 1/2020 | Okajima | | |
| 2020/0250805 A1* | 8/2020 | Tsukamoto | ........... | G06T 7/0002 |
| 2021/0136244 A1* | 5/2021 | Shimizu | ................ | G06F 3/1255 |
| 2023/0053580 A1* | 2/2023 | Tanaka | ............... | H04N 1/32309 |
| 2024/0103775 A1* | 3/2024 | Misawa | ................ | G06F 3/1285 |

* cited by examiner

FIG. 4

IMPOSITION INFORMATION

I-1

I-2

SHEET NUMBER

40

COORDINATES-CONVERSION INFORMATION $$I\text{-}1 \quad \begin{bmatrix} a, & b, & c \\ d, & e, & f \\ g, & h, & i \end{bmatrix}$$

$$I\text{-}2 \quad \begin{bmatrix} j, & k, & l \\ m, & n, & o \\ p, & q, & r \end{bmatrix}$$

AFTER-CONVERSION LOGICAL-PAGE-REGION INFORMATION

| REGION ID | RECTANGLE-STARTING COORDINATES | RECTANGLE-ENDING COORDINATES | INSPECTION LEVEL |
|---|---|---|---|
| L1-1 | (L1-1xs´, L1-1ys´) | (L1-1xe´, L1-1ye´) | INSPECTION |
| L2-1 | (L2-1xs´, L2-1ys´) | (L2-1xe´, L2-1ye´) | NO INSPECTION |
| L3-1 | (L3-1xs´, L3-1ys´) | (L3-1xe´, L3-1ye´) | INSPECTION |
| L4-1 | (L4-1xs´, L4-1ys´) | (L4-1xe´, L4-1ye´) | INSPECTION |
| L1-2 | (L1-2xs´, L1-2ys´) | (L1-2xe´, L1-2ye´) | INSPECTION |
| L2-2 | (L2-2xs´, L2-2ys´) | (L2-2xe´, L2-2ye´) | NO INSPECTION |
| L3-2 | (L3-2xs´, L3-2ys´) | (L3-2xe´, L3-2ye´) | INSPECTION |
| L4-2 | (L4-2xs´, L4-2ys´) | (L4-2xe´, L4-2ye´) | INSPECTION |

30

L1

L2

L3

L4

LOGICAL-PAGE-REGION INFORMATION

| REGION ID | RECTANGLE-STARTING COORDINATES | RECTANGLE-ENDING COORDINATES | INSPECTION LEVEL |
|---|---|---|---|
| L1 | (L1xs, L1ys) | (L1xe, L1ye) | INSPECTION |
| L2 | (L2xs, L2ys) | (L2xe, L2ye) | NO INSPECTION |
| L3 | (L3xs, L3ys) | (L3xe, L3ye) | INSPECTION |
| L4 | (L4xs, L4ys) | (L4xe, L4ye) | INSPECTION |

FIG. 5

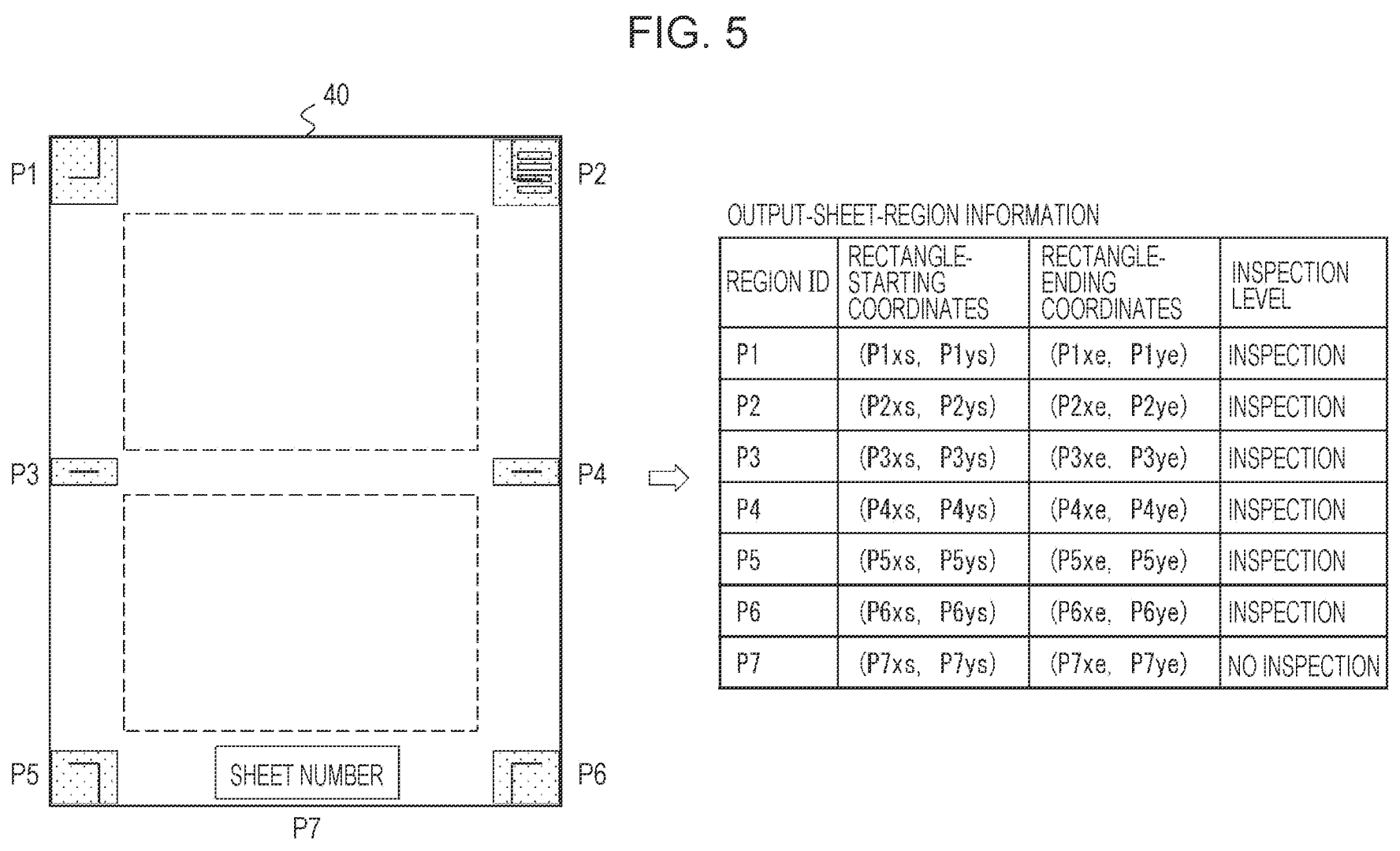

OUTPUT-SHEET-REGION INFORMATION

| REGION ID | RECTANGLE-STARTING COORDINATES | RECTANGLE-ENDING COORDINATES | INSPECTION LEVEL |
|---|---|---|---|
| P1 | (P1xs, P1ys) | (P1xe, P1ye) | INSPECTION |
| P2 | (P2xs, P2ys) | (P2xe, P2ye) | INSPECTION |
| P3 | (P3xs, P3ys) | (P3xe, P3ye) | INSPECTION |
| P4 | (P4xs, P4ys) | (P4xe, P4ye) | INSPECTION |
| P5 | (P5xs, P5ys) | (P5xe, P5ye) | INSPECTION |
| P6 | (P6xs, P6ys) | (P6xe, P6ye) | INSPECTION |
| P7 | (P7xs, P7ys) | (P7xe, P7ye) | NO INSPECTION |

40

P1 P2 P3 P4 P5 P6 P7

SHEET NUMBER

FIG. 6

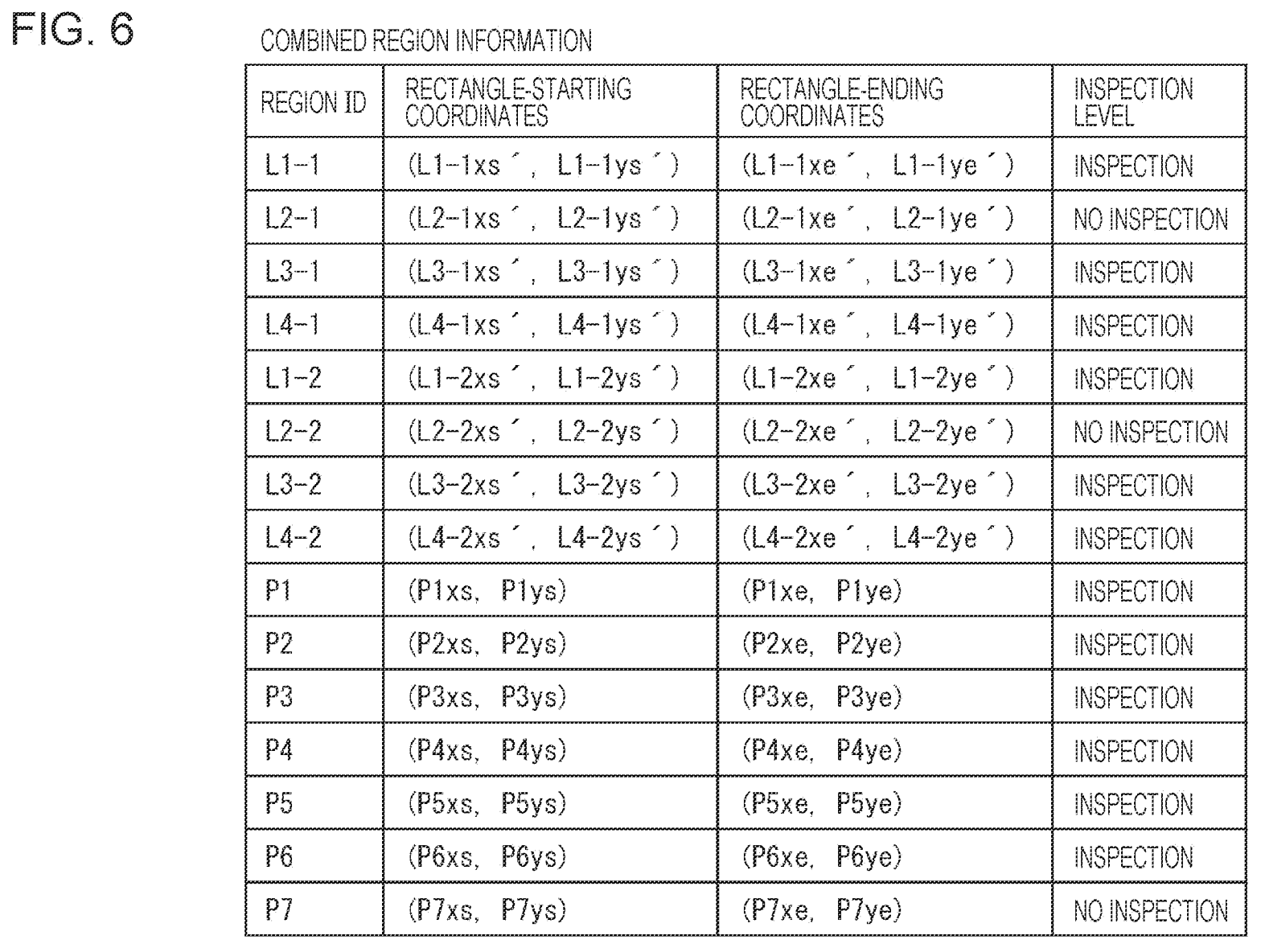

COMBINED REGION INFORMATION

| REGION ID | RECTANGLE-STARTING COORDINATES | RECTANGLE-ENDING COORDINATES | INSPECTION LEVEL |
|---|---|---|---|
| L1-1 | (L1-1xs', L1-1ys') | (L1-1xe', L1-1ye') | INSPECTION |
| L2-1 | (L2-1xs', L2-1ys') | (L2-1xe', L2-1ye') | NO INSPECTION |
| L3-1 | (L3-1xs', L3-1ys') | (L3-1xe', L3-1ye') | INSPECTION |
| L4-1 | (L4-1xs', L4-1ys') | (L4-1xe', L4-1ye') | INSPECTION |
| L1-2 | (L1-2xs', L1-2ys') | (L1-2xe', L1-2ye') | INSPECTION |
| L2-2 | (L2-2xs', L2-2ys') | (L2-2xe', L2-2ye') | NO INSPECTION |
| L3-2 | (L3-2xs', L3-2ys') | (L3-2xe', L3-2ye') | INSPECTION |
| L4-2 | (L4-2xs', L4-2ys') | (L4-2xe', L4-2ye') | INSPECTION |
| P1 | (P1xs, P1ys) | (P1xe, P1ye) | INSPECTION |
| P2 | (P2xs, P2ys) | (P2xe, P2ye) | INSPECTION |
| P3 | (P3xs, P3ys) | (P3xe, P3ye) | INSPECTION |
| P4 | (P4xs, P4ys) | (P4xe, P4ye) | INSPECTION |
| P5 | (P5xs, P5ys) | (P5xe, P5ye) | INSPECTION |
| P6 | (P6xs, P6ys) | (P6xe, P6ye) | INSPECTION |
| P7 | (P7xs, P7ys) | (P7xe, P7ye) | NO INSPECTION |

INFORMATION PROCESSING APPARATUS, NON-TRANSITORY COMPUTER READABLE MEDIUM, AND INFORMATION PROCESSING METHOD

CROSS-REFERENCE TO RELATED APPLICATIONS

This application is based on and claims priority under 35 USC 119 from Japanese Patent Application No. 2022-152301 filed Sep. 26, 2022.

BACKGROUND

(i) Technical Field

The present disclosure relates to an information processing apparatus, a non-transitory computer readable medium, and an information processing method.

(ii) Related Art

In the digital print market, high quality is required for printed material that is to be produced. To achieve this, an inspection apparatus is provided to inspect printed material, that is, print results on sheets. Specifically, read images of printed material are compared with ground-truth images of the printed material, which are prepared in advance, to inspect the printed material.

However, inspection of the entire area of each page included in printed material puts a heavy load on the inspection apparatus, and takes a lot of time, which may be inefficient.

For example, a page included in printed material may have parts for which print accuracy is required, and parts for which print accuracy is not required. In the related art, an area including a part for which print accuracy is required is set in advance as an inspection region; an area including a part for which print accuracy is not required is set in advance as a non-inspection region. An inspection apparatus inspects only inspection regions as target regions in each page. In addition, in the related art, the following technique has been proposed: different inspection accuracies are set for inspection regions depending on objects that are printed on a page (for example, Japanese Unexamined Patent Application Publication No. 2020-006603).

Another technique of the related art is disclosed in Japanese Unexamined Patent Application Publication No. 11-328415.

In the print industry, arranging multiple pages on a single output sheet for printing, that is, so-called imposition, may be performed. In imposition, the position and size of a page that is to be arranged on an output sheet may be determined by scaling the page or changing the orientation of the page.

A print-page-inspection specified region, for which whether inspection of a print result of a print page is necessary is specified, that is, a region corresponding to an inspection region or a non-inspection region described above, may be set in advance in the print page. In imposition, for example, when the print orientation of a print page is changed from vertical to horizontal, the orientation of a print-page-inspection specified region included in the page also needs to be changed from vertical to horizontal in agreement with the orientation of the print page. In addition, for example, when a print page is scaled, a print-pageinspection specified region included in the page similarly needs to be scaled with reference to the scaling ratio of the page.

Thus, when the orientation or size of a print page need to be changed in imposition, or when the settings of a print page, such as the orientation and size of the print page, which has been arranged on an output sheet are changed, settings of a print-page-inspection specified region need to be readjusted in agreement with the change of settings. In the related art, the readjustment of a print-page-inspection specified region takes time and effort.

SUMMARY

Aspects of non-limiting embodiments of the present disclosure relate to a technique which enables adjustment for imposition without changing settings of a print-page-inspection specified region, for which whether inspection of a print result is necessary is specified, when a print page including the print-page-inspection specified region is to be imposed on a physical output sheet.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus comprising a processor configured to: obtain region information of a print-page-inspection specified region for which whether inspection of a print result of a print page is necessary is specified, the region information being information in which a relative position from a reference position of the print page is indicated by coordinate values; generate coordinates-conversion information from imposition information indicating an imposition position at which the print page is to be imposed on a physical output sheet, the coordinates-conversion information being used in imposition of the print page at the imposition position on the output sheet; perform coordinates conversion on the region information according to the coordinates-conversion information, in imposition of the print page on the output sheet; and set the print-page-inspection specified region on the output sheet in accordance with coordinate values obtained after the coordinates conversion.

BRIEF DESCRIPTION OF THE DRAWINGS

Exemplary embodiment of the present disclosure will be described in detail based on the following figures, wherein:

FIG. 4 is a diagram illustrating the relationship between logical page, logical-page-region information, coordinates-conversion information, and after-conversion logical-page-region information, according to the present exemplary embodiment;

FIG. 5 is a diagram illustrating the relationship between output sheet and output-sheet-region information, according to the present exemplary embodiment; and FIG. 6 is a diagram illustrating an exemplary data configuration of combined region information according to the present exemplary embodiment.

DETAILED DESCRIPTION

An exemplary embodiment of the present disclosure will be described below on the basis of the drawings.

A print system 10 according to the present exemplary embodiment produces printed material by printing one or more print pages. The print system 10 according to the present exemplary embodiment has a function of so-called imposition in which, in production of printed material, multiple pages are arranged on a single physical output sheet for printing. Each page on an output sheet, which is subjected to imposition and printing, is cut out of the output sheet through cutting.

In addition, the print system 10 according to the present exemplary embodiment has a function of inspection to ensure the quality of printed material. On a print page, print-page-inspection specified regions, for each of which whether inspection of a print result of the print page is necessary is specified, are set. A print-page-inspection specified region is typically a region including characters, images, or objects obtained by combining characters with images. For example, a print-page-inspection specified region is set by specifying an area for each piece of information, such as an address, a name, or a face image. As in a print page, output-sheet-inspection specified regions, for each of which whether inspection of a print result of an output sheet is necessary is specified, may be also set on the output sheet. In the description below, when "print-page-inspection specified regions" and "output-sheet-inspection specified regions" are described without discrimination, they are collectively called "inspection-specified regions".

The page is arranged on an output sheet. Thus, like output-sheet-inspection specified regions, print-page-inspection specified regions are necessarily formed on an output sheet. However, output-sheet-inspection specified regions are set for inspection of an output sheet. Thus, an output-sheet-inspection specified region does not include a print-page-inspection specified region which is set for inspection of a print page.

Inspection-specified regions include inspection regions, on which inspection is performed, and non-inspection regions, on which inspection is not performed. Therefore, the print system 10 compares an image in an inspection region, which is extracted from a read image of printed material, with a ground-truth image for the inspection region, which is prepared in advance. Thus, the print system 10 inspects the printed material. In the present exemplary embodiment, the shape of inspection-specified regions is rectangular. However, the shape of the inspection-specified regions is not necessary to be rectangular.

Figure 1:
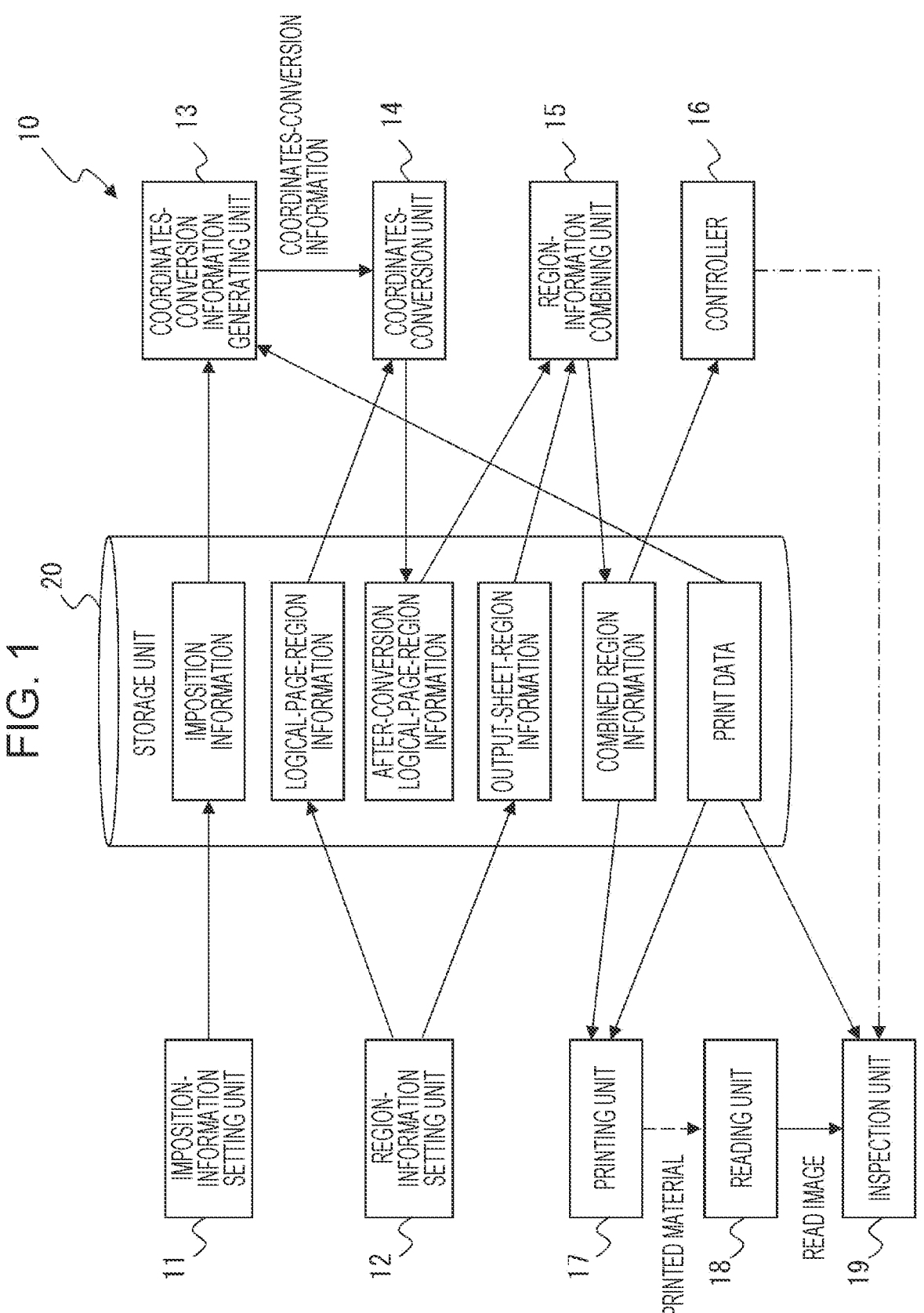
FIG. 1 is a block diagram illustrating the configuration of a print system according to the present exemplary embodiment.

FIG. 1 is a block diagram illustrating the configuration of the print system 10 according to the present exemplary embodiment. The print system 10 according to the present exemplary embodiment includes an imposition-information setting unit 11, a region-information setting unit 12, a coordinates-conversion information generating unit 13, a coordinates-conversion unit 14, a region-information combining unit 15, a controller 16, a printing unit 17, a reading unit 18, an inspection unit 19, and a storage unit 20.

Components which are not described in the present exemplary embodiment are not illustrated.

The imposition-information setting unit 11 generates information about imposition in which multiple pages are arranged on an output sheet according to user operations, and registers the generated information as imposition information in the storage unit 20. The region-information setting unit 12 sets, for registration in the storage unit 20, logical-page-region information and output-sheet-region information according to user operations.

A single output sheet may be also regarded as a single page. Thus, in the present exemplary embodiment, for clear discrimination from an output sheet, multiple pages arranged on the output sheet are referred to "logical pages" which are arranged on the output sheet for printing. In contrast, a physical print sheet on which multiple logical pages are arranged is referred to as an "output sheet".

The logical-page-region information, which is set by the region-information setting unit 12, is information indicating the positions and areas of logical-page-inspection specified regions (a synonymous with "print-page-inspection specified regions") included in a logical page. The reference position in the two-dimensional coordinates system is typically indicated with coordinates data (0,0). When the reference position of a logical page, for example, the upper-left corner of the logical page, is set as the reference position, the logical-page-region information describes the relative position and area, from the reference position of the logical page, of each logical-page-inspection specified region, which has a rectangular shape and which is included in the logical page, by using the coordinate values ("rectangle-starting coordinates" in FIG. 4) of the upper-left corner and the coordinate values ("rectangle-ending coordinates" in FIG. 4) of the lower-right corner of the logical-page-inspection specified region. The logical-page-region information is not changed even when the logical page 30 is subjected to coordinates conversion. Information obtained after coordinates conversion is separately generated as after-conversion logical-page-region information.

When, for example, the upper-left corner of an output sheet is set to the reference position of the output sheet, the output-sheet-region information describes the relative position and area, from the reference position of the output sheet, of each output-sheet-inspection specified region, which has a rectangular shape and which is included in the output sheet, by using the coordinate values ("rectangle-starting coordinates" in FIG. 5) of the upper-left corner and the coordinate values ("rectangle-ending coordinates" in FIG. 5) of the lower-right corner of the output-sheet-inspection specified region.

The area of an inspection-specified region may be indicated, not by using the rectangle-ending coordinates, but, for example, by using the lengths in the X-axis direction and the Y-axis direction from the rectangle-starting coordinates.

The coordinates-conversion information generating unit 13 refers to imposition information, and generates coordinates-conversion information for converting the coordinate values of each logical-page-inspection specified region, which is set in the logical-page-region information, into the coordinate values used when the logical page is arranged on an output sheet. The coordinates-conversion unit 14 uses the generated coordinates-conversion information to convert each set of coordinate values which are set in the logical-page-region information, into the coordinate values used when the logical page is arranged on the output sheet. The coordinates-conversion unit 14 registers, in the storage unit 20, the logical-page-region information obtained after conversion, as after-conversion logical-page-region information. The region-information combining unit 15 combines the after-conversion logical-page-region information with the output-sheet-region information to generate combined region information for registration in the storage unit 20. The controller 16 controls operations, including printing and inspection, performed by the print system 10. The printing unit 17 refers to the combined region information, and performs printing on a specified output sheet. Printed material is output through printing by the printing unit 17. The reading unit 18 uses a scanner to read the printed material and thus generates a read image. The inspection unit 19 compares the read image of the printed material with print data, that is, a ground-truth image of the printed material, and thus inspects the inspection regions.

The print system 10 according to the present exemplary embodiment may be implemented by using substantially the same hardware configuration as that of the related art. The print system 10 includes a printing apparatus, an inspection apparatus, and an inspection control apparatus. For example, the printing apparatus includes the printing unit 17 and the reading unit 18. The printing apparatus is a form of image forming apparatus provided with at least a print function, a scanner function, and the like, and includes a computer. The printing apparatus includes, for example, a central processing unit (CPU), a read-only memory (ROM), a random-access memory (RAM), a hard disk drive (HDD) as a storage unit, a printer, a scanner, an operation panel as a user interface, and a network interface as a communication unit.

For example, the inspection apparatus includes the inspection unit 19. The inspection apparatus includes therein a general-purpose computer of the related art. The inspection apparatus includes, for example, a CPU, a ROM, a RAM, an HDD as a storage unit, and a network interface as a communication unit.

For example, the inspection control apparatus includes the imposition-information setting unit 11, the region-information setting unit 12, the coordinates-conversion information generating unit 13, the coordinates-conversion unit 14, the region-information combining unit 15, the controller 16, and the storage unit 20. The inspection control apparatus may be implemented by using a general-purpose computer such as a personal computer (PC) of the related art. The inspection control apparatus includes, for example, a CPU, a ROM, a RAM, an HDD as a storage unit, a mouse, a keyboard, and a display serving as a user interface, and a network interface as a communication unit.

The hardware configuration of the print system 10 is exemplary. The configuration is not limited to this. For example, a rasterizer which rasterizes print data that is to be printed, and a server computer which receives print jobs including print data may be included as separate apparatuses. Thus, the print system 10 may include multiple processors or a single processor. The storage unit 20 may include multiple storage units.

Each of the components 11 to 19 in the print system 10 is implemented through collaborative operations between computers included in the print system 10 and programs executed by the CPUs included in the computers. The storage unit 20 is implemented by using HDDs in the print system 10. Alternatively, a RAM or an external storage unit may be used over a network.

The programs used in the present exemplary embodiment may be provided not only through communication units but also through storage in a computer-readable recording medium such as a Universal Serial Bus (USB) memory. The programs provided from communication units or a recording medium are installed in computers, and the CPUs of the computers run the programs sequentially to implement various types of processes.

The operations according to the present exemplary embodiment will be described. The overview of the imposition process according to the present exemplary embodiment will be described by using FIG. 2.

FIGS. 2A to 2C illustrate a logical page 30 and an output sheet 40. The logical page 30 illustrated in FIG. 2A includes logical-page-inspection specified regions 32 of inspection regions 32a and a non-inspection region 32b. More specifically, the logical page 30 includes the inspection regions 32a indicated by region 1 (L1), region 3 (L3), and region 4 (L4), and the non-inspection region 32b indicated by region 2 (L2). When the inspection regions 32a and the non-inspection region 32b are described with no discrimination, these regions are collectively called "logical-page-inspection specified regions 32" as described above.

The output sheet 40 illustrated in FIG. 2B includes output-sheet-inspection specified regions 42 of inspection regions 42a and a non-inspection region 42b, and logical-page regions 44 in which logical pages are arranged. In the example illustrated in FIG. 2B, two pages of the logical page 30 are arranged on the output sheet 40. The output sheet 40 includes the inspection regions 42a indicated by region 1 (P1) to region 6 (P6), and the non-inspection region 42b indicated by region 7 (P7). When the inspection regions 42a and the non-inspection region 42b are described with no discrimination, these regions are collectively called "output-sheet-inspection specified regions 42" as described above.

The output sheet 40 illustrated in FIG. 2B corresponds to imposition information indicating at which positions and in which areas the logical page 30 is to be arranged on an output sheet. On the basis of the imposition information illustrated in FIG. 2B, it is understood, from the shape of a logical-page region 44, that, in arranging the logical page 30 on the output sheet 40, the logical page 30 in the vertical orientation needs to be converted so that the orientation of the logical page 30 is changed to the horizontal orientation and the logical page 30 is reduced in size.

Therefore, as illustrated in FIG. 2C, logical pages 30a and 30b, which are formed by performing, on the logical page 30, coordinates conversion described below, are disposed in the logical-page regions 44 according to the imposition information. Thus, an output sheet 40A which is a print target is generated.

FIGS. 2A to 2C illustrate the inspection regions 32a and 42a, which are generated on the logical page 30 and the output sheet 40, with a dot pattern.

Figure 3:
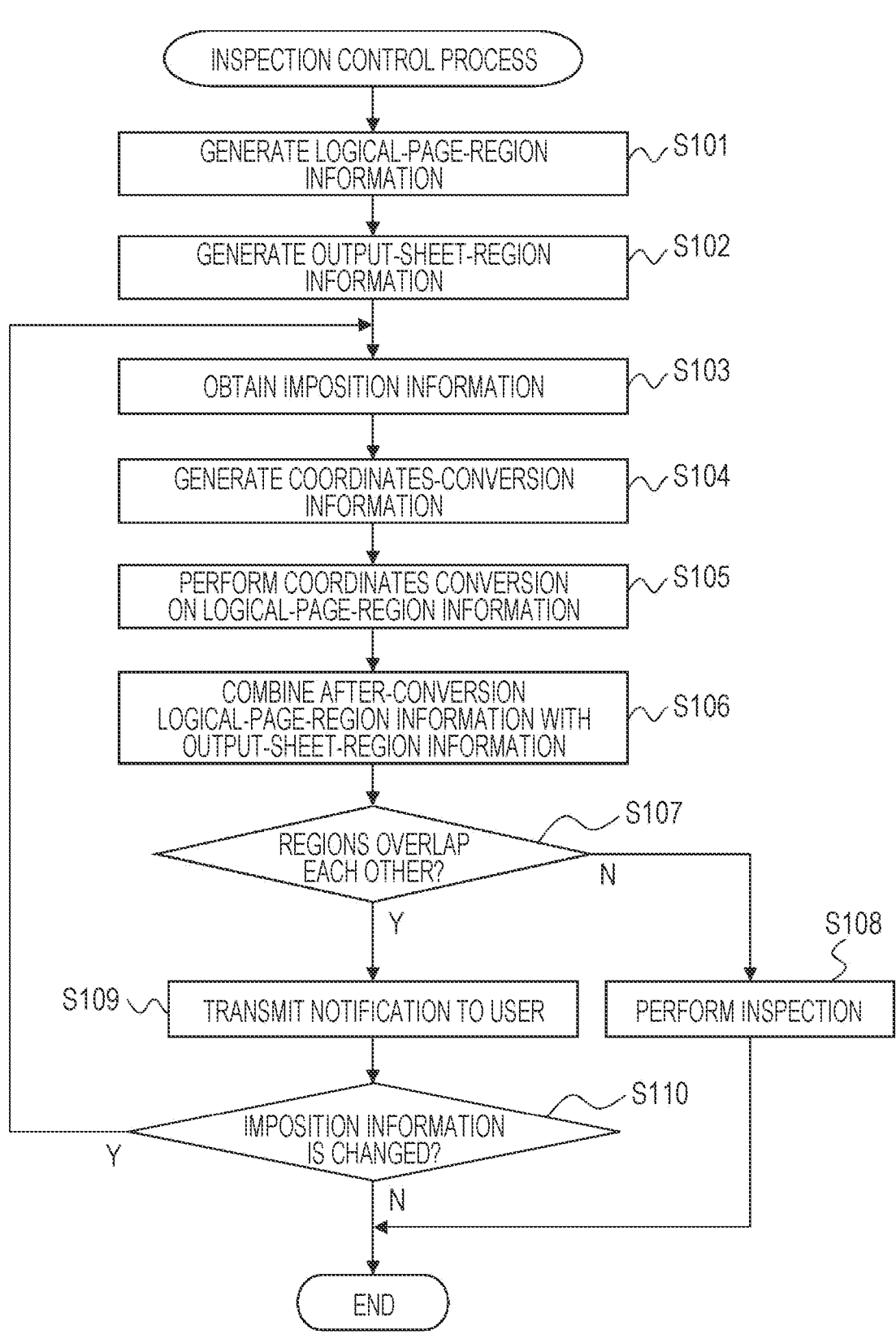
FIG. 3 is a flowchart of an inspection control process according to the present exemplary embodiment.

The output sheet 40A, on which the logical pages 30a and 30b are imposed as described above, is printed to inspect the output printed material. An inspection control process according to the present exemplary embodiment will be described by using the flowchart in FIG. 3. The imposition information for a logical page 30 is set in advance by the imposition-information setting unit 11, and is registered in the storage unit 20.

Figure 2:
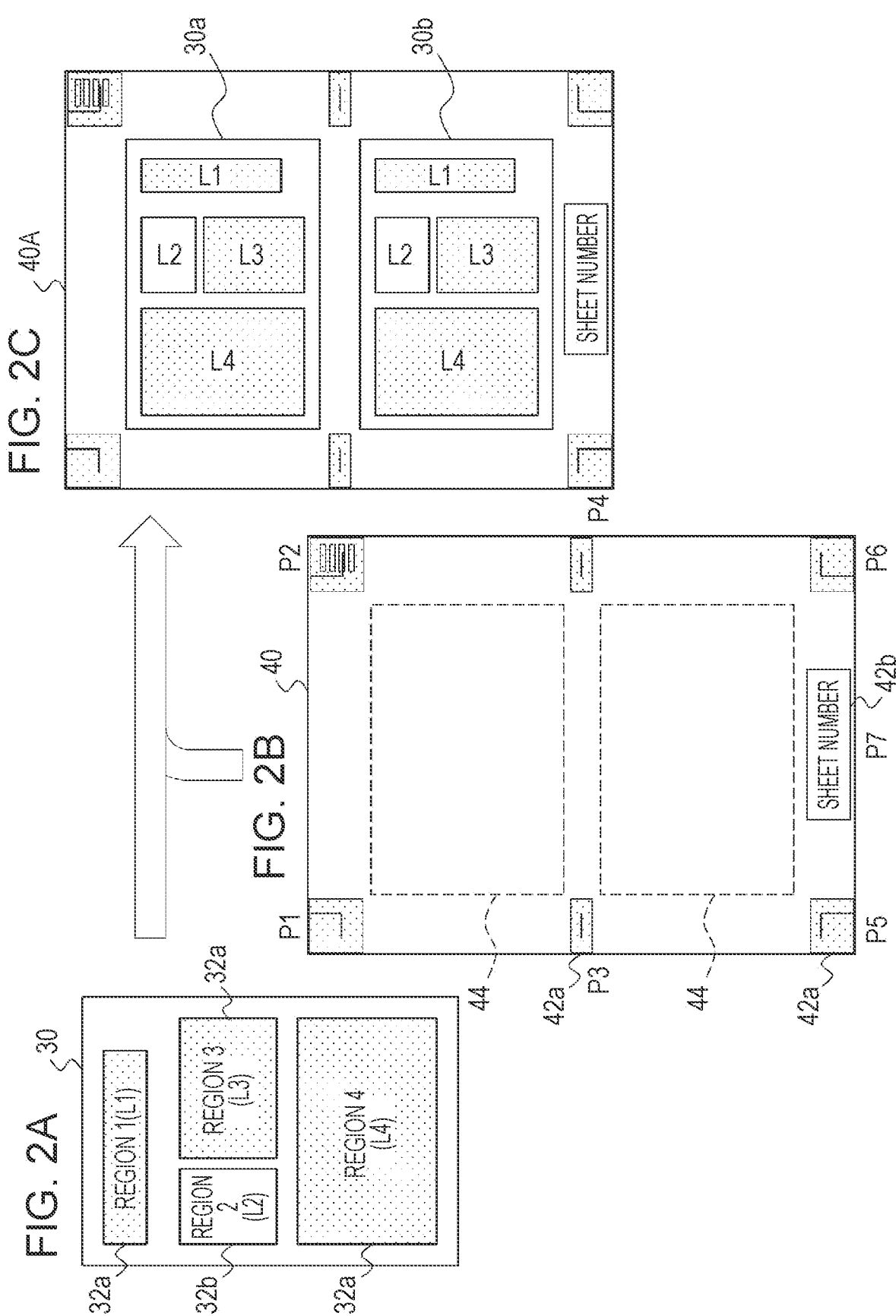
FIGS. 2A to 2C are conceptual diagrams illustrating the overview of an imposition process according to the present exemplary embodiment.

The print system 10 obtains, from the outside, a print job including print data which is to be printed. The print job includes one or more pages corresponding to the print data. Herein, for convenience of description, one logical page 30, which is illustrated in FIG. 2, in the print data will focus on. Actually, a process such as rasterization may be performed on the print data. If a process, which is necessary to perform printing, is not a feature process in the present exemplary embodiment, the process will not be described as appropriate, for simplification of the description.

A user displays a predetermined setting screen, and sets logical-page-inspection specified regions on the logical page 30 through the setting screen. When the user sets logical-page-inspection specified regions, the region-information setting unit 12 detects the position and area of each logical-page-inspection specified region from the settings, and generates logical-page-region information for registration in the storage unit 20 (step 101).

FIG. 4 illustrates the logical page 30, in which logical-page-inspection specified regions have been already set, and logical-page-region information generated by the region-information setting unit 12 on the basis of the logical page 30. The logical page 30 illustrated in FIG. 4 is the same page as that in FIG. 2. The logical-page-region information is generated for each logical page 30. For each logical-page-inspection specified region included in the logical page 30, a region ID which is identification information of the logical-page-inspection specified region, the rectangle-starting coordinates and the rectangle-ending coordinates which are information for specifying the position and area of the logical-page-inspection specified region, and the inspection level of the logical-page-inspection specified region are set in association with each other. As described above, the rectangle-starting coordinates are coordinate values indicating the relative position of the upper-left corner of the logical-page-inspection specified region in the two-dimensional coordinates system from the reference position (for example, the upper-left corner) of the logical page 30. The rectangle-ending coordinates are coordinate values indicating the relative position of the lower-right corner of the logical-page-inspection specified region in the two-dimensional coordinates system from the reference position of the logical page 30. The inspection level according to the present exemplary embodiment is information indicating whether the region is an inspection region or a non-inspection region. If the accuracy of inspection is set for an inspection region, for example, in multiple stages of inspection accuracy level, such as high, middle, and low, an inspection level indicating the accuracy is set.

Then, the user displays a predetermined setting screen on a display, and sets, through the setting screen, output-sheet-inspection specified regions on an output sheet 40. When the user sets output-sheet-inspection specified regions, the region-information setting unit 12 detects the position and area of each output-sheet-inspection specified region from the settings, and generates output-sheet-region information for registration in the storage unit 20 (step 102). Steps 101 and 102 may be performed in the reverse order.

FIG. 5 illustrates the output sheet 40 on which output-sheet-inspection specified regions have been set, and output-sheet-region information generated by the region-information setting unit 12 on the basis of the output sheet 40. The output sheet 40 illustrated in FIG. 5 is the same as that in FIG. 2. The output-sheet-region information is generated for each output sheet 40. For each output-sheet-inspection specified region included in the output sheet 40, a region ID which is identification information of the output-sheet-inspection specified region, the rectangle-starting coordinates and the rectangle-ending coordinates which are information for specifying the position and area of the output-sheet-inspection specified region, and the inspection level of the output-sheet-inspection specified region are set in association with each other. As described above, the rectangle-starting coordinates are coordinate values indicating the position of the upper-left corner of the output-sheet-inspection specified region in the two-dimensional coordinates system from the reference position (for example, the upper-left corner) of the output sheet 40. The rectangle-ending coordinates are coordinate values indicating the position of the lower-right corner of the output-sheet-inspection specified region in the two-dimensional coordinates system from the reference position of the output sheet 40. The inspection level according to the present exemplary embodiment is information indicating whether the region is an inspection region or a non-inspection region. Like the logical-page-region information, an inspection level may be set for each inspection region in multiple stages of inspection level.

Subsequently, the coordinates-conversion information generating unit 13 reads the imposition information from the storage unit 20 for acquisition (step 103). As described above, the imposition information is prepared in advance. The coordinates-conversion information generating unit 13 refers to the print data to obtain attribute information of the logical page 30, especially, information with which the size of the logical page 30 may be specified, such as the sheet size. The attribute information of the logical page 30 may be included in the logical-page-region information. For example, with reference to FIG. 2, it is understood that, to print the logical page 30 within the logical-page regions 44 of the output sheet 40, the logical page 30 needs to be subjected to coordinates conversion, for example, for rotation of 90° to the right and reduction in size. Therefore, the coordinates-conversion information generating unit 13 refers to the size information of the logical page 30 and the imposition information to generate imposition positions of the logical page 30, that is, coordinates-conversion information for imposition which leads to the state in which the logical page 30 is within the logical-page regions 44 (step 104). In the present exemplary embodiment, the coordinates-conversion information is generated by using determinants as illustrated in FIG. 4. The technique of generating coordinates-conversion information may be a method of the related art.

Subsequently, the coordinates-conversion unit 14 obtains the logical-page-region information from the storage unit 20, and performs coordinates conversion on each set of coordinate values of the rectangle-starting coordinates and the rectangle-ending coordinates, which are included in the logical-page-region information, according to the coordinates-conversion information generated by the coordinates-conversion information generating unit 13 (step 105). Thus, the coordinates-conversion unit 14 generates after-conversion logical-page-region information from the logical-page-region information. FIG. 4 illustrates after-conversion logical-page-region information generated from the logical-page-region information by the coordinates-conversion unit 14 performing coordinates conversion. In the present exemplary embodiment, two logical pages 30 are arranged on the output sheet 40. As illustrated in FIG. 4, the after-conversion logical-page-region information includes information corresponding to each of the two logical pages 30.

Subsequently, the region-information combining unit 15 combines the after-conversion logical-page-region information with the output-sheet-region information to generate combined region information for registration in the storage unit 20 (step 106).

FIG. 6 is a diagram illustrating an exemplary data configuration of the combined region information according to the present exemplary embodiment. As illustrated in FIG. 6, the combined region information is generated by combining the after-conversion logical-page-region information in FIG. 4 with the output-sheet-region information in FIG. 5. The logical pages 30a and 30b obtained after coordinates conversion are set on the output sheet 40 according to the combined region information.

Subsequently, the controller 16 exerts predetermined control, which is described below, in accordance with the positional relationship between logical-page-inspection specified regions and output-sheet-inspection specified regions. The positional relationship between logical-page-inspection specified regions and output-sheet-inspection specified regions, for example, whether inspection-specified regions overlap each other, which is described below, may be determined by referring to the combined region information.

As in the output sheet 40A illustrated in FIG. 2, the logical-page-inspection specified regions and the output-sheet-inspection specified regions may be usually set so as not to overlap each other. Therefore, if no inspection-specified regions overlap each other (N in step 107), the controller 16 instructs the printing unit 17 to perform printing. As in the related art, the inspection unit 19 compares a read image, which is generated by the reading unit 18 scanning the printed material produced through printing, with a ground-truth image of the printed material, which is obtained from the print data, and thus inspects the printed material (step 108).

In contrast, if, with some reason, an overlap between a logical-page-inspection specified region and an output-sheet-inspection specified region occurs (Y in step 107), the controller 16 notifies the user of occurrence of the overlap (step 109). This notification may be made, for example, through display of a warning message on a display of the inspection control apparatus.

The user, who has received the notification, changes imposition information so that the logical-page-inspection specified region and the output-sheet-inspection specified region do not overlap each other. If the user has changed the imposition information (Y in step 110), the imposition-information setting unit 11 obtains the changed imposition information (step 103), and updates the imposition information stored in the storage unit 20.

After that, the processes described above are repeatedly performed. In the present exemplary embodiment, as illustrated in the logical-page-region information, the position and area of each logical-page-inspection specified region are set by using relative coordinate values defined by using, as the reference, the reference position of the logical page 30. Therefore, the coordinates-conversion information generating unit 13 refers to the updated imposition information to generate the coordinates-conversion information again (step 104). The coordinates-conversion unit 14 uses the coordinates-conversion information, which is generated again by the coordinates-conversion information generating unit 13, to perform coordinates conversion on each set of coordinate values of the rectangle-starting coordinates and the rectangle-ending coordinates which are included in the logical-page-region information, and thus generates the after-conversion logical-page-region information again (step 105). After that, as described above, the region-information combining unit 15 combines the after-conversion logical-page-region information, which is generated again, with the output-sheet-region information to generate again combined region information for registration in the storage unit 20 (step 106). Then, the logical pages 30a and 30b obtained after coordinates conversion are set again on the output sheet 40 according to the combined region information generated again.

That is, the present exemplary embodiment enables after-conversion logical-page-region information, which is necessary for imposition on the output sheet 40, to be obtained without changing logical-page-region information.

In contrast, if the user has not changed the imposition information (N in step 110), the process ends because the overlap between a logical-page-inspection specified region and an output-sheet-inspection specified region fails to be eliminated. Alternatively, the process may not end, and the inspection may be controlled as follows.

For example, the inspection levels of the logical-page-inspection specified region and the output-sheet-inspection specified region which overlap each other are referred to. If the inspection levels are the same, that is, in the present exemplary embodiment, if both the regions are inspection regions or non-inspection regions, the controller 16 exerts control so that the inspection unit 19 inspects the inspection-specified regions overlapping each other, or does not inspect the inspection-specified regions overlapping each other, in accordance with the inspection level. If the inspection levels of the logical-page-inspection specified region and the output-sheet-inspection specified region which overlap each other are not the same, the controller 16 causes the inspection to be performed in accordance with the settings of the inspection levels. That is, in the present exemplary embodiment, if one region is an inspection region, the other is a non-inspection region. Therefore, the controller 16 exerts control so that both the logical-page-inspection specified region and the output-sheet-inspection specified region which overlap each other are regarded as the same type of regions, that is, inspection regions or non-inspection regions.

Alternatively, if multiple stages of inspection level, that is, high, middle, and low which are described above, are set to inspection regions, the inspection is performed in accordance with the inspection levels. For example, the inspection is performed with the highest inspection level among the inspection regions. Contrary to this, the inspection may be performed with the lowest inspection level among the inspection regions, or may be performed with the average of the inspection levels.

Alternatively, when an overlap between a logical-page-inspection specified region and an output-sheet-inspection specified region has been detected, the controller 16 may exert control so that, without automatic processing as described above, an inquiry is transmitted to a user to make the user specify how to address the overlap.

In the embodiments above, the term "processor" refers to hardware in a broad sense. Examples of the processor include general processors (e.g., CPU) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

An information processing apparatus comprising:

a processor configured to:

obtain region information of a print-page-inspection specified region for which whether inspection of a print result of a print page is necessary is specified, the region information being information in which a relative position from a reference position of the print page is indicated by coordinate values;

generate coordinates-conversion information from imposition information indicating an imposition position at which the print page is to be imposed on a physical output sheet, the coordinates-conversion information being used in imposition of the print page at the imposition position on the output sheet;

perform coordinates conversion on the region information according to the coordinates-conversion information, in imposition of the print page on the output sheet; and set the print-page-inspection specified region on the output sheet in accordance with coordinate values obtained after the coordinates conversion.

(((2)))

The information processing apparatus according to (((1))), wherein the processor is configured to:

generate again the coordinates-conversion information from the imposition information which is updated in response to change of the imposition of the print page;

perform coordinates conversion on the region information according to the coordinates-conversion information generated again; and set again the print-page-inspection specified region on the output sheet in accordance with the coordinate values obtained after the coordinates conversion.

(((3)))

The information processing apparatus according to (((2))), wherein the processor is configured to:

hold the coordinate values obtained after the coordinates conversion.

(((4)))

The information processing apparatus according to (((1))), wherein the processor is configured to:

obtain output-sheet region information of an output-sheet-inspection specified region for which whether inspection of a print result of the output sheet is necessary is specified, the output-sheet region information being information in which a position from a reference position of the output sheet is indicated by coordinate values; and exert predetermined control in accordance with positional relationship between the print-page-inspection specified region and the output-sheet-inspection specified region, in imposition of the print page.

12

(((5)))

The information processing apparatus according to (((4))), wherein the processor is configured to:

if the print-page-inspection specified region overlaps the output-sheet-inspection specified region in imposition of the print page, perform notification using a warning as the predetermined control.

(((6)))

The information processing apparatus according to (((4))) or (((5))), wherein the processor is configured to:

if the print-page-inspection specified region overlaps the output-sheet-inspection specified region in imposition of the print page, when both the print-page-inspection specified region and the output-sheet-inspection specified region overlapping each other are inspection regions for which necessity of the inspection of a print result is specified, exert control, as the predetermined control, such that the inspection is performed with a higher accuracy level among accuracy levels which are set for the respective inspection regions, the accuracy levels being levels for the inspection of a print result.

(((7)))

The information processing apparatus according to (((4))) or (((5))), wherein the processor is configured to:

if the print-page-inspection specified region overlaps the output-sheet-inspection specified region in imposition of the print page, when one of the print-page-inspection specified region and the output-sheet-inspection specified region overlapping each other is an inspection region for which necessity of the inspection of a print result is specified and the other is a non-inspection region for which unnecessity of the inspection of a print result is specified, exert control, as the predetermined control, such that both the print-page-inspection specified region and the output-sheet-inspection specified region overlapping each other are handled as inspection regions or non-inspection regions.

(((8)))

The information processing apparatus according to (((4))), wherein the processor is configured to:

if the print-page-inspection specified region overlaps the output-sheet-inspection specified region in imposition of the print page, exert control, as the predetermined control, such that a user is made to specify how to handle the print-page-inspection specified region and the output-sheet-inspection specified region overlapping each other.

(((9)))

A program causing a computer to execute a process comprising:

obtaining region information of a print-page-inspection specified region for which whether inspection of a print result of a print page is necessary is specified, the region information being information in which a relative position from a reference position of the print page is indicated by coordinate values;

generating coordinates-conversion information from imposition information indicating an imposition position at which the print page is to be imposed on a physical output sheet, the coordinates-conversion information being used in imposition of the print page at the imposition position on the output sheet;

performing coordinates conversion on the region information according to the coordinates-conversion information, in imposition of the print page on the output sheet; and setting the print-page-inspection specified region on the output sheet in accordance with coordinate values obtained after the coordinates conversion.

What is claimed is:

1. An information processing apparatus comprising:
a processor configured to:
   obtain region information of a print-page-inspection specified region, the print-page-inspection specified region being designated as either an inspection region or a non-inspection region for a print result of a print page, the region information being information in which a relative position from a reference position of the print page is indicated by coordinate values;
   generate coordinates-conversion information from imposition information indicating an imposition position at which the print page is to be imposed on a physical output sheet, the coordinates-conversion information being used in imposition of the print page at the imposition position on the output sheet;
   perform coordinates conversion on the region information according to the coordinates-conversion information, in imposition of the print page on the output sheet;
   set the print-page-inspection specified region on the output sheet in accordance with coordinate values obtained after the coordinates conversion;
   obtain output-sheet region information of an output-sheet-inspection specified region, the output-sheet inspection specified region being designated as either an inspection region or a non-inspection region for a print result of an output sheet, the output-sheet region information being information in which a position from a reference position of the output sheet is indicated by coordinate values; and
   exert predetermined control in accordance with a positional relationship between the print-page-inspection specified region and the output-sheet-inspection specified region, in imposition of the print page.

2. The information processing apparatus according to claim 1,
   wherein the processor is configured to:
   generate again the coordinates-conversion information from the imposition information which is updated in response to change of the imposition of the print page;
   perform coordinates conversion on the region information according to the coordinates-conversion information generated again; and
   set again the print-page-inspection specified region on the output sheet in accordance with the coordinate values obtained after the coordinates conversion.

3. The information processing apparatus according to claim 2,
   wherein the processor is configured to:
   hold the coordinate values obtained after the coordinates conversion.

4. The information processing apparatus according to claim 1,
   wherein the processor is configured to:
   if the print-page-inspection specified region overlaps the output-sheet-inspection specified region in imposition of the print page, perform notification using a warning as the predetermined control.

5. The information processing apparatus according to claim 4,
   wherein the processor is configured to:
   if the print-page-inspection specified region overlaps the output-sheet-inspection specified region in imposition of the print page, when both the print-page-inspection specified region and the output-sheet-inspection specified region overlapping each other are inspection regions for which necessity of the inspection of a print result is specified, exert control, as the predetermined control, such that the inspection is performed with a higher accuracy level among accuracy levels which are set for the respective inspection regions, the accuracy levels being levels for the inspection of a print result.

6. The information processing apparatus according to claim 4,
   wherein the processor is configured to:
   if the print-page-inspection specified region overlaps the output-sheet-inspection specified region in imposition of the print page, when one of the print-page-inspection specified region and the output-sheet-inspection specified region overlapping each other is an inspection region for which necessity of the inspection of a print result is specified and the other is a non-inspection region for which unnecessity of the inspection of a print result is specified, exert control, as the predetermined control, such that both the print-page-inspection specified region and the output-sheet-inspection specified region overlapping each other are handled as inspection regions or non-inspection regions.

7. The information processing apparatus according to claim 1,
   wherein the processor is configured to:
   if the print-page-inspection specified region overlaps the output-sheet-inspection specified region in imposition of the print page, when both the print-page-inspection specified region and the output-sheet-inspection specified region overlapping each other are inspection regions for which necessity of the inspection of a print result is specified, exert control, as the predetermined control, such that the inspection is performed with a higher accuracy level among accuracy levels which are set for the respective inspection regions, the accuracy levels being levels for the inspection of a print result.

8. The information processing apparatus according to claim 1,
   wherein the processor is configured to:
   if the print-page-inspection specified region overlaps the output-sheet-inspection specified region in imposition of the print page, when one of the print-page-inspection specified region and the output-sheet-inspection specified region overlapping each other is an inspection region for which necessity of the inspection of a print result is specified and the other is a non-inspection region for which unnecessity of the inspection of a print result is specified, exert control, as the predetermined control, such that both the print-page-inspection specified region and the output-sheet-inspection specified region overlapping each other are handled as inspection regions or non-inspection regions.

9. The information processing apparatus according to claim 1, wherein the processor is configured to:

if the print-page-inspection specified region overlaps the output-sheet-inspection specified region in imposition of the print page, exert control, as the predetermined control, such that a user is made to specify how to handle the print-page-inspection specified region and the output-sheet-inspection specified region overlapping each other.

10. A non-transitory computer readable medium storing a program causing a computer to execute a process comprising:

obtaining region information of a print-page-inspection specified region, the print-page-inspection specified region being designated as either an inspection region or a non-inspection region for a print result of a print page, the region information being information in which a relative position from a reference position of the print page is indicated by coordinate values;

generating coordinates-conversion information from imposition information indicating an imposition position at which the print page is to be imposed on a physical output sheet, the coordinates-conversion information being used in imposition of the print page at the imposition position on the output sheet;

performing coordinates conversion on the region information according to the coordinates-conversion information, in imposition of the print page on the output sheet; and setting the print-page-inspection specified region on the output sheet in accordance with coordinate values obtained after the conversion;

obtaining output-sheet region information of an output-sheet-inspection specified region, the output-sheet-inspection specified region being designated as either an inspection region or a non-inspection region for a print result of an output sheet, the output-sheet region information being information in which a position from a reference position of the output sheet is indicated by coordinate values; and exerting predetermined control in accordance with a positional relationship between the print-page-inspection specified region and the output-sheet-inspection specified region, in imposition of the print page.

11. An information processing method comprising:

obtaining region information of a print-page-inspection specified region, the print-page-inspection specified region being designated as either an inspection region or a non-inspection region for a print result of a print page, the region information being information in which a relative position from a reference position of the print page is indicated by coordinate values;

generating coordinates-conversion information from imposition information indicating an imposition position at which the print page is to be imposed on a physical output sheet, the coordinates-conversion information being used in imposition of the print page at the imposition position on the output sheet;

performing coordinates conversion on the region information according to the coordinates-conversion information, in imposition of the print page on the output sheet; and setting the print-page-inspection specified region on the output sheet in accordance with coordinate values obtained after the conversion;

obtaining output-sheet region information of an output-sheet-inspection specified region, the output-sheet-inspection specified region being designated as either an inspection region or a non-inspection region for a print result of an output sheet, the output-sheet region information being information in which a position from a reference position of the output sheet is indicated by coordinate values; and exerting predetermined control in accordance with a positional relationship between the print-page-inspection specified region and the output-sheet-inspection specified region, in imposition of the print page.

* * * * *